United States Patent [19]

White et al.

[11] Patent Number: 5,785,497
[45] Date of Patent: Jul. 28, 1998

[54] CONTROL ROD MOUNTING ARRANGEMENT FOR HELICOPTER SWASHPLATES

[75] Inventors: Kevin A. White, Shelton; David H. Hunter, Cheshire; Robert J. Milne, Litchfield; Stephen V. Poulin, Shelton; Robert J. Trembicki, Milford, all of Conn.

[73] Assignee: Sikorsky Aircraft Corporation, Stratford, Conn.

[21] Appl. No.: 814,373

[22] Filed: Mar. 11, 1997

[51] Int. Cl.⁶ ............................................. B64C 27/605
[52] U.S. Cl. ............................ 416/114; 416/168 R; 403/67; 403/79
[58] Field of Search ............................ 416/114, 115, 416/168 R, 168 A, 244 D; 403/67, 79, 157

[56] References Cited

U.S. PATENT DOCUMENTS

| | | | |
|---|---|---|---|
| 3,972,491 | 8/1976 | Ferris et al. | 244/17.27 |
| 4,227,856 | 10/1980 | Verrill et al. | 416/1 |
| 4,588,355 | 5/1986 | Ferris et al. | 416/114 |
| 4,688,993 | 8/1987 | Ferris et al. | 416/114 |
| 4,804,315 | 2/1989 | Ferris et al. | 416/114 |
| 4,917,526 | 4/1990 | Paterson | 403/79 |
| 5,067,875 | 11/1991 | Hunter et al. | 416/114 |
| 5,074,494 | 12/1991 | Doolin et al. | 244/17.25 |
| 5,083,725 | 1/1992 | Byrnes et al. | 244/17.25 |
| 5,120,195 | 6/1992 | Schmaling et al. | 416/134 A |

*Primary Examiner*—Thomas E. Denion
*Assistant Examiner*—Richard Woo
*Attorney, Agent, or Firm*—Brian A. Collins

[57] ABSTRACT

A mounting arrangement (60) for coupling a control rod (38) to a stationary swashplate member (32) of a helicopter swashplate assembly (30) wherein the mounting arrangement (60) is characterized by a specially configured stationary swashplate member (32) and a trunnion fitting (62) for mounting in combination therewith. More specifically, the stationary swashplate member (32) includes a horizontal web (74) disposed between an inner ring segment ($72_{IR}$) and an outer ring segment ($72_{OR}$), wherein the horizontal web (74) includes an aperture (78) and defines a mounting surface ($74_S$). The trunnion fitting (62) includes a base (64) defining a mounting surface ($64_S$) and a pair of mounting ears (66) having aligned apertures ($66_O$). The mounting surface ($64_S$) of the trunnion fitting (62) engages the mounting surface ($74_S$) of the horizontal web (74) such that the mounting ears (66) are disposed through the aperture (78) of the horizontal web (74). The mounting arrangement (60) further includes a mounting device (80) for demountably affixing the trunnion fitting (62) in combination with the horizontal web (74) and a coupling device (84), disposed in combination with the aligned apertures ($66_O$), for coupling the control rod (38) in combination with the trunnion fitting (62).

18 Claims, 3 Drawing Sheets

CONTROL ROD MOUNTING ARRANGEMENT FOR HELICOPTER SWASHPLATES

TECHNICAL FIELD

This invention is directed to a control rod mounting arrangement, and more particularly, to a mounting arrangement for coupling a control rod to a stationary swashplate member of a helicopter swashplate assembly.

BACKGROUND OF THE INVENTION

Blade pitch control in rotorcraft is typically achieved through the use of a swashplate assembly which transmits control inputs from a stationary system to a rotating system. Conventionally, a swashplate assembly employs a stationary swashplate member capable of axial and tilt translation about a rotor shaft axis, a rotating swashplate member co-axial with the stationary member, and a bearing assembly disposed between the stationary and rotating swashplate members for accommodating relative rotational motion therebetween. The stationary swashplate member is coupled to input control rods which move in response to pilot or automatic flight control inputs while the rotating swashplate member is coupled to each rotor blade via a pitch control rod.

FIG. I depicts a side section view through a typical in-plane swashplate assembly 100. Only one half of the swashplate assembly is illustrated, i.e., to the left side of the rotor shaft axis 102, inasmuch as the opposed half is structurally similar. The swashplate assembly 100 includes a stationary swashplate member 104 which is centered and supported about a standpipe 106 by means of a spherical bearing or mount 108. The spherical mount 108 is capable of sliding vertically on the standpipe 106 and, furthermore, facilitates tilt motion of the stationary swashplate member 104. The swashplate assembly 100 also includes a coaxial rotating swashplate member 114 which mounts to the stationary member 104 by means of a duplex bearing 118. The duplex bearing 118 is capable of reacting vertical shear loads while accommodating relative rotation between the stationary and rotating swashplate members 104, 114. Accordingly, apart from relative rotation, the stationary and rotating swashplate members 104, 114 tilt and translate as an integrated unit.

Control inputs, via pilot or automatic flight control commands, are made via at least three input control rods 120 which mount to the stationary swashplate member 104 and are operative to define the plane of the swashplate assembly 100, i.e., the vertical position and orientation thereof. Control output to the rotor blades (not shown) is made via output or pitch control rods 122 which mount to the rotating swashplate member 114 and which are operative to impart pitch motion to each rotor blade.

Each of the input control rods 120 includes a rod end bearing $120_E$ which is articulately mounted to an integrally formed clevis 124 of the stationary swashplate member 104. The clevis 124 defines aligned apertures for accepting a radially oriented expandable bolt 130. Moreover, the integrally formed clevis 124 is proximal to the duplex bearing 118 SO as to minimize flexure of the swashplate assembly 100 between the respective mounting points of the input control rod 120 and the pitch control rod 122. Furthermore, such location accommodates insertion and removal of the expandable bolt 130 inasmuch as clearance must be provided between the innermost external wall 132 of the stationary swashplate member 104 and the clevis 124 to accommodate the length of the expandable bolt 130.

While such mounting arrangement produces a structurally efficient attachment, i.e., via an integral clevis 124 which minimizes flexure, the mounting arrangement presents several assembly and design difficulties. Firstly, the mounting arrangement involves blind installation of the expandable bolt 130. As such, it is difficult to ascertain whether the expandable bolt 130, and, more specifically, the expandable end retainer 136 thereof, has cleared and positively engaged the blind side 138 of the clevis 124. Secondly, the location of the clevis 124 and the clearance required to accommodate installation and removal of the expandable bolt 130, increases the overall diameter of the swashplate assembly 100. That is, the diameter of the stationary swashplate member 104 must be, at a minimum, two times (2X) the length of the expandable bolt 130. Thirdly, the radial orientation of the expandable bolt 130 limits the range of angular alignment for attaching each input control rod 120 relative to the plane of the swashplate assembly 100. As configured, the articulate mount is capable of accommodating an offset angle θ of about 9 to 13 degrees. Such restricted range of motion limits the options available to the designer to orient the input control rod 120. Finally, the installation of the expandable bolt 130 is cumbersome due to the relatively small envelope and limited access to the nut 140 and Allen-type head 142 thereof. That is, insofar as the nut 140 and the Allen-type head 142 are essentially co-located, it is difficult to engage and turn each relative to the other within the space constraints of the stationary swashplate member 104.

SUMMARY OF THE INVENTION

It is an object of the present invention to provide a mounting arrangement for coupling the rod end of an control rod to a stationary swashplate member of a swashplate assembly which mounting arrangement is inspectable thereby ensuring positive retention of the control rod.

It is another object of the present invention to provide such a mounting arrangement which facilitates assembly/disassembly thereof.

It is yet another object of the present invention to provide such a mounting arrangement which facilitates a large range of angular motion of the control rod relative to the plane of the swashplate.

It is yet a further object of the present invention to provide such a mounting arrangement which facilitates greater design flexibility with respect to the diametral envelope of the swashplate assembly.

It is still a further object of the present invention to provide a stationary swashplate member which is structurally configured to accommodate such mounting arrangement.

It is yet another object of the present invention to provide such a stationary swashplate member which is structurally configured to accommodate the loads and motions of such mounting arrangement without distortion or flexure.

These and other objects are achieved by a mounting arrangement for coupling a control rod to a stationary swashplate member of a helicopter swashplate assembly wherein the mounting arrangement is characterized by a specially configured stationary swashplate member and a trunnion fitting for mounting in combination therewith. More specifically, the stationary swashplate member includes a horizontal web disposed between an inner ring segment and an outer ring segment, wherein the horizontal web includes an aperture and defines a mounting surface. The trunnion fitting includes a base defining a mounting surface and a pair of mounting ears having aligned apertures. The mounting surface engages the mounting surface of the horizontal web such that the mounting ears are disposed through the aperture of the horizontal web. The mounting arrangement further includes a mounting means for demountably affixing the trunnion fitting in combination with the horizontal web and a coupling means, disposed in combination with the aligned apertures, for coupling the control rod in combination with the trunnion fitting.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

Figure 2:
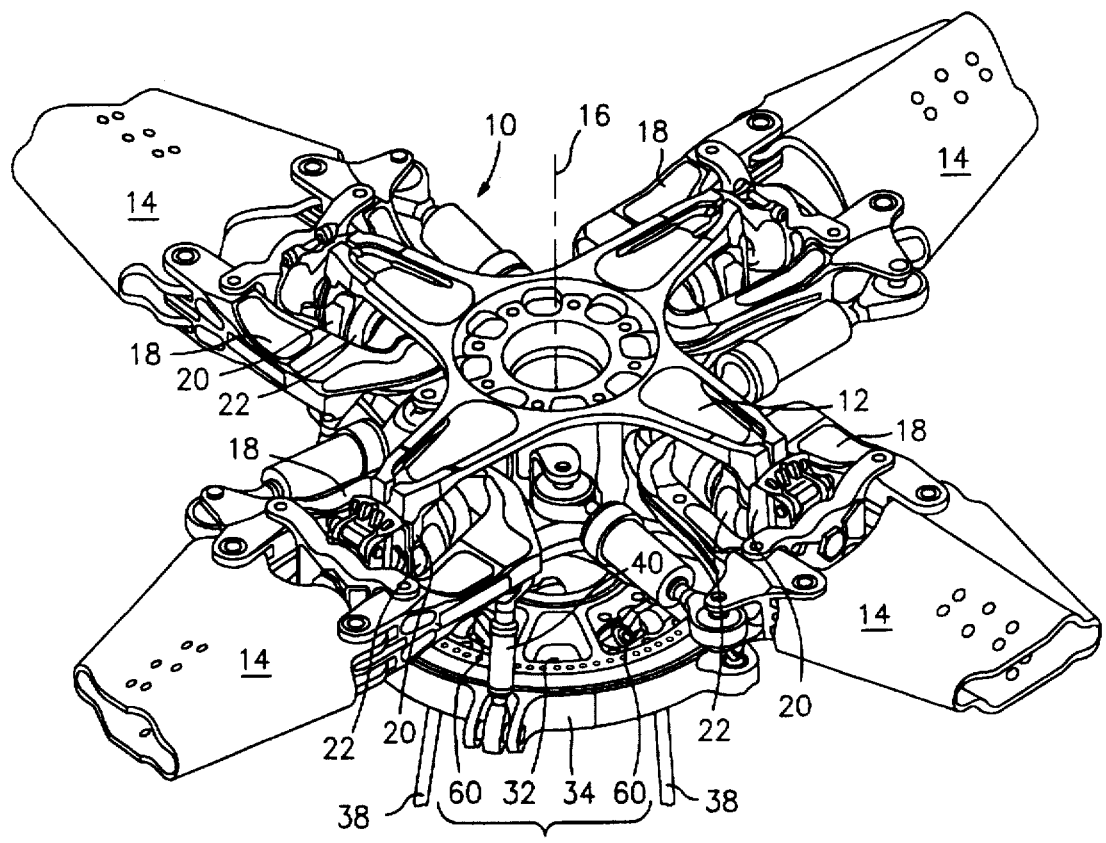
FIG. 2 is a perspective view of a helicopter rotor system and a swashplate assembly including a mounting arrangement and a stationary swashplate member according to the present invention.

Referring now to the drawings wherein like reference characters identify corresponding or similar elements throughout the several views, FIG. 2 shows a perspective view of a rotor system 10 which is responsive to control inputs (hereinafter referred to as pitch inputs) from a swashplate assembly 30. More specifically the rotor system 10 comprises a hub retention plate 12 for driving a plurality of rotor blade assemblies 14 about an axis of rotation 16. Each rotor blade assembly 14 includes a rotor yoke assembly 18 which circumscribes, in looped fashion, a vertical shear segment 20 of the hub retention plate 12. Interposed therebetween is a spherical elastomeric bearing 22 to accommodate the various motions of the respective rotor blade assembly 14, e.g., pitch, in-plane and out-of-plane motion.

Figure 3:
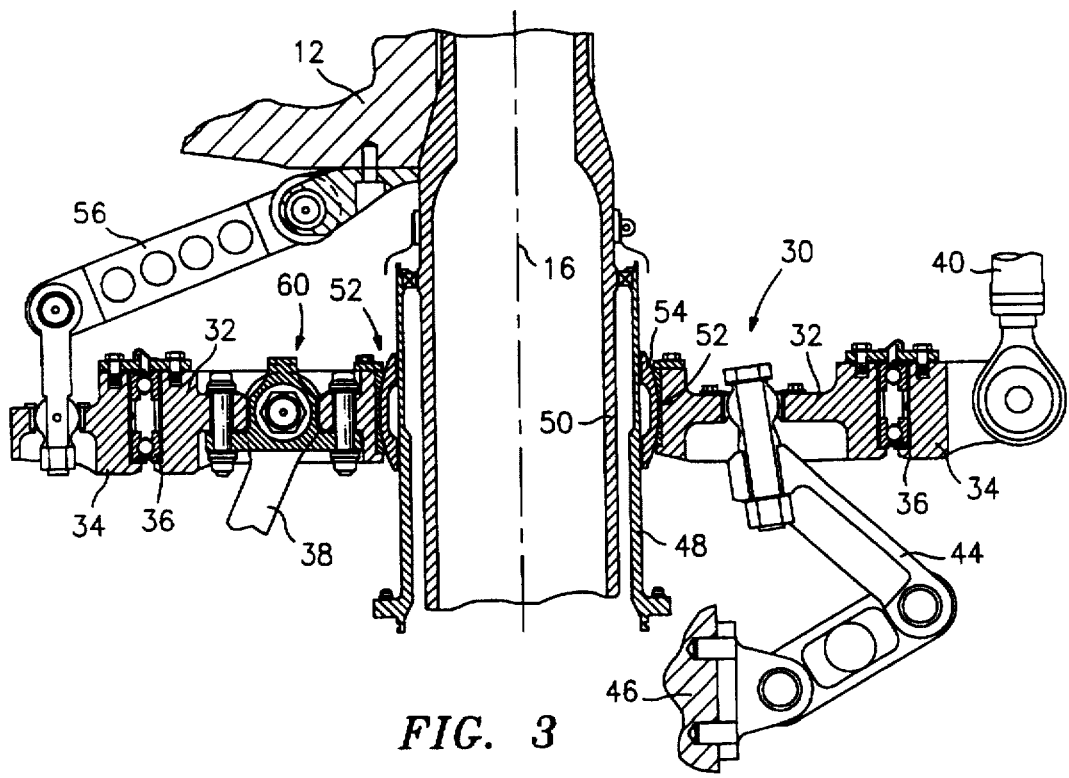
FIG. 3 is a sectional view through the swashplate assembly for revealing the internal details thereof.
Figure 5:
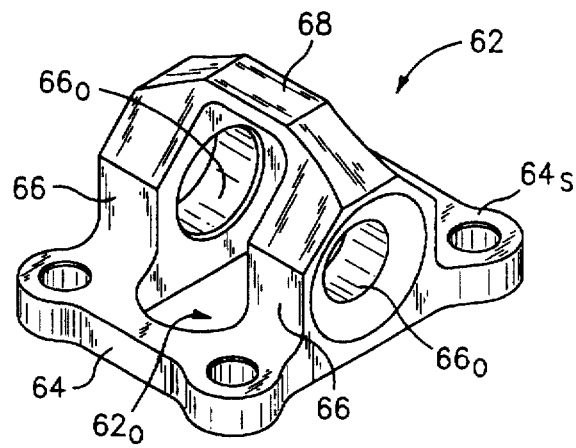
FIG. 5 is an isolated perspective view of a trunnion fitting of the mounting arrangement according to the present invention.

In FIGS. 2 and 3, the swashplate assembly 30 employs a stationary swashplate member 32 capable of axial and tilt translation about the rotor shaft axis 16, a rotating swashplate member 34 co-axial with the stationary swashplate member 32, and a bearing assembly 36 (see FIG. 3) disposed between the stationary and rotating members 32, 34 for accommodating relative rotational motion therebetween. The stationary swashplate member 32 is coupled to input control rods 38 by means of a mounting arrangement 60 according to the present invention while the rotating swashplate member 34 is coupled to each rotor yoke assembly 18 via an output or pitch control rod 40. Before discussing the inventive features of the mounting arrangement 60 and the stationary swashplate member 32, a detailed description of the swashplate assembly 30 and its operation will be provided.

Referring to FIG. 3, the stationary swashplate member 32 is rotationally fixed by means of a scissors linkage 44 which is mounted to a stationary airframe structure 46 such as a gearbox housing (not shown). Furthermore, the stationary swashplate member 32 is centered about a stationary standpipe 48 which circumscribes a main rotor shaft 50. The centering or support of the stationary swashplate member 32 is effected by a spherical bearing or mount 52 which is operative to slide axially on the standpipe 48 while, furthermore, defining a spherical surface 54 for accommodating tilt motion of the stationary swashplate member 32.

The rotating swashplate member 34 is coaxially aligned with the stationary swashplate member 32 and is supported about the stationary swashplate member 32 by the bearing assembly 36 (hereinafter referred to as a duplex bearing). The duplex bearing assembly 36 is operative to accommodate relative rotation between the stationary and rotating members 32, 34 while being capable of reacting vertical shear loads thereacross. Additionally, the rotating swashplate member 34 is driven by a rotating scissors linkage 56 which is mounted to the underside of the hub retention plate 12. As such, the rotating swashplate member 34 is driven at the same rotational speed as the rotor system thereby maintaining the spatial relationship of each pitch control rod 40 with respect to the respective rotor blade assembly 14. Furthermore, it will be appreciated that the rotating swashplate member 34 translates and tilts in conjunction with the stationary swashplate member 32.

In operation, control inputs, via pilot or automatic flight control commands, are made via the input control rods 38 which are operative to define the plane of the swashplate assembly 30, i.e., the vertical position and orientation thereof. Control output to the rotor blade assemblies 14 is made via the pitch control rods 40 which are operative to impart pitch motion to the rotor blade assemblies 14.

In FIGS. 4–7, the mounting arrangement 60 for each input control rod 38 and stationary swashplate member 32 are more clearly illustrated. While three such mounting arrangements 60 will be necessary for defining the plane of the swashplate assembly 30, it will only be necessary to describe one of the mounting arrangements 60 inasmuch as the remaining others are essentially identical. The mounting arrangement 60 is characterized by a trunnion fitting 62 (best shown in FIG. 5) and several structural modifications to the stationary swashplate member 32 to accept the trunnion fitting 62.

In the preferred embodiment, each trunnion fitting 62 includes a base 64 defining a mounting surface $64_S$ and a pair of mounting ears 66 defining a clevis. The trunnion fitting 62 also defines an opening $62_O$ in the base 64 for accepting the input control rod 38 and includes aligned apertures $66_O$ for accepting a through bolt 84 (see FIG. 7) which, when assembled, engages the respective input control rod 38.

Figure 1:
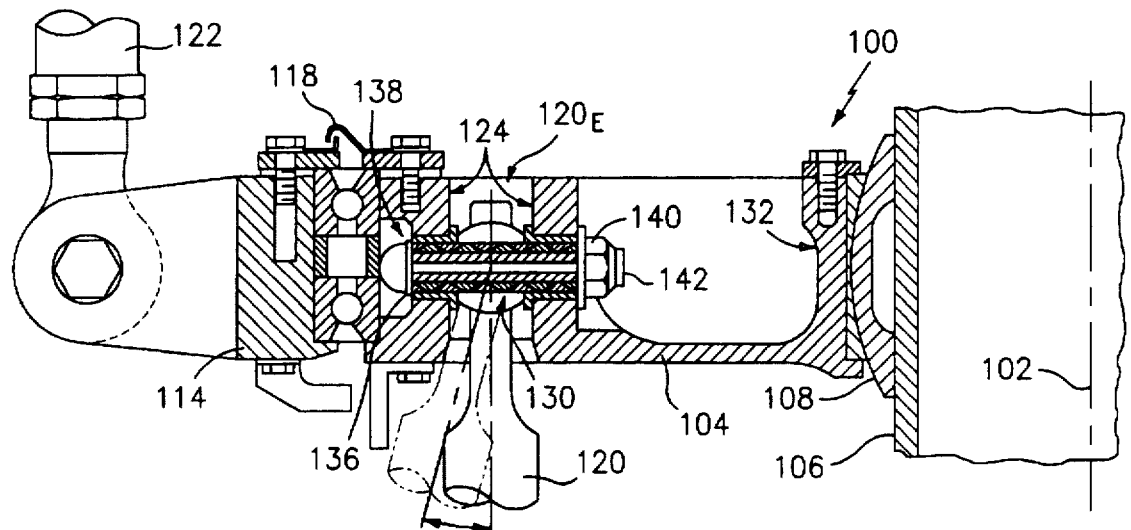
FIG. 1 is a partial section view through a prior art swashplate assembly.
Figure 4:
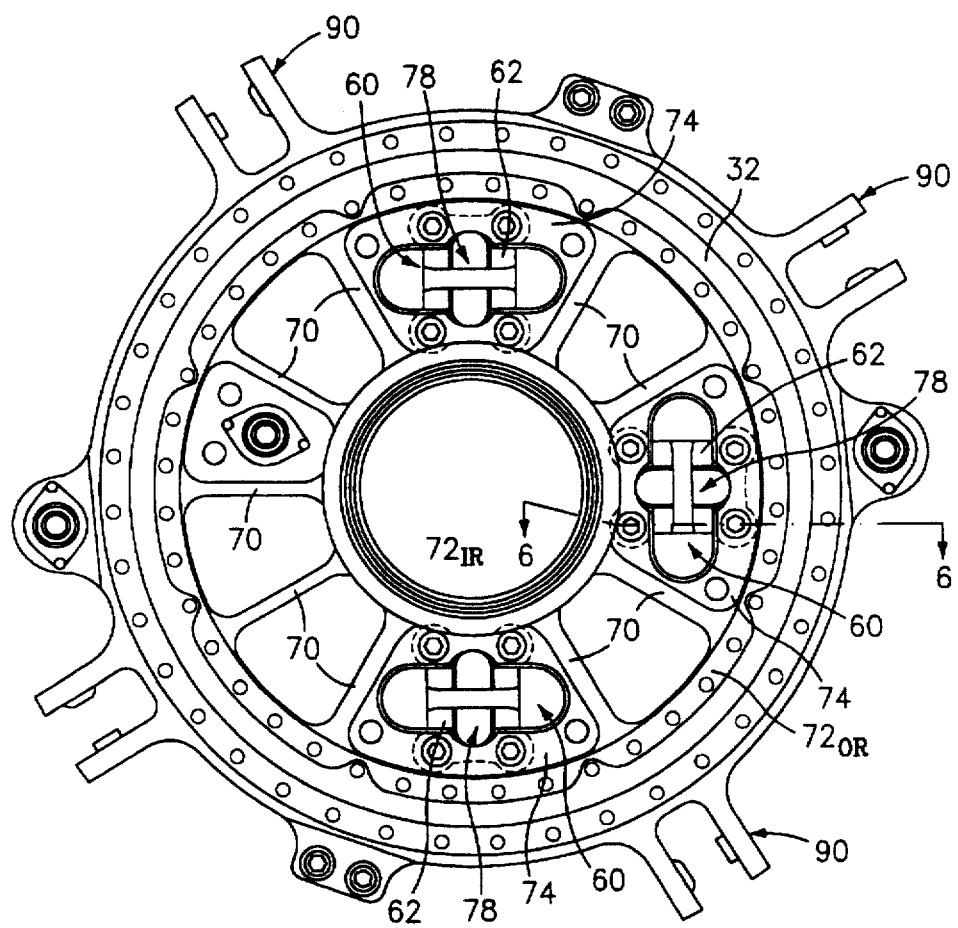
FIG. 4 is a top view of the swashplate assembly including the relevant details of the mounting arrangement and the stationary swashplate member.
Figure 6:
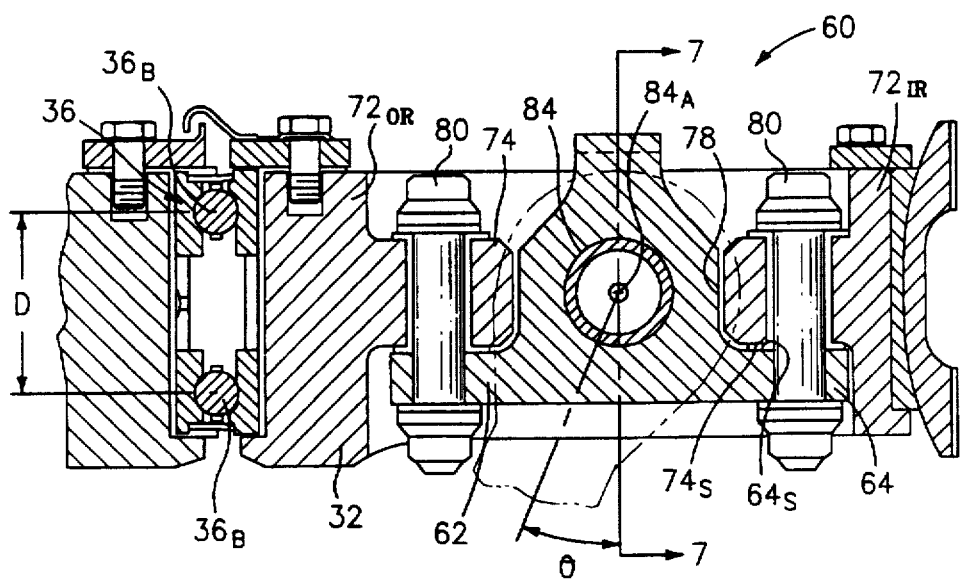
FIG. 6 is a cross-sectional view taken substantially along line 6—6 of FIG. 4.
Figure 7:
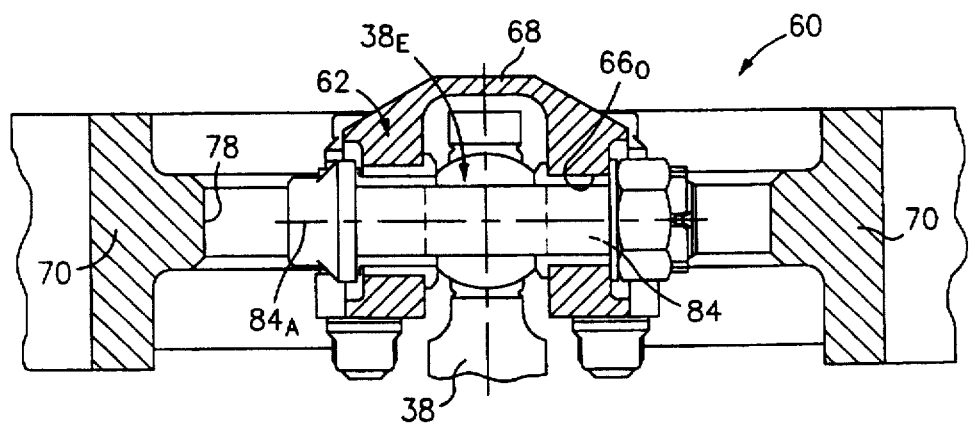
FIG. 7 is a cross-sectional view taken substantially along line 7—7 of FIG. 6.

In FIGS. 4, 6 and 7, the stationary swashplate member 32 defines a plurality of radial spokes 70 extending from an inner ring segment $72_{IR}$ to an outer ring segment $72_{OR}$ of the stationary swashplate member 32. Furthermore, a horizontal web 74 is integrally formed between and structurally interconnects adjacent radial spokes 70 in areas corresponding to desired location of each respective input control rod 38. Each horizontal web 74 defines a mounting surface $74_S$ and an aperture 78 which, in combination, engage and accept the trunnion fitting 62. More specifically, the mounting ears 66 of the trunnion fitting 62 project through the aperture 78 from the underside of the stationary swashplate member 32 such that the mounting surface $64_S$ of the trunnion fitting 62 engages the mounting surface $74_S$ of the horizontal web 74. In the described embodiment, four bolts 80 extend through the base 64 of the trunnion fitting 62 and the horizontal web 74 to fasten the trunnion fitting 62 in combination with the web 74. Furthermore, a through bolt 84 extends through the aligned apertures $66_O$ of the trunnion fitting 62 to engage the rod end bearing $38_E$ of the respective input control rod 38. As assembled, the axis $84_A$ of the through bolt 84 (hereinafter referred to as the mounting axis $84_A$) is disposed substantially perpendicular relative to a radial line projecting from the rotational axis 16 (see FIG. 3) of the drive shaft 50.

As discussed in the Background of the invention, prior art mounting arrangements are difficult to assemble/disassemble and employ blind installation of an expandable bolt. In contrast, the mounting arrangement 60 of the present invention permits subassembly of the trunnion fitting 62 in combination with the rod end bearing $38_E$ of the input control rod 38 prior to final assembly with the stationary swashplate member 32. As such, it will be appreciated that the mounting arrangement 60 facilitates assembly and disassembly by disassociating the rod end attachment from the swashplate attachment. Furthermore, the mounting arrangement 60 provides access to both sides of the trunnion fitting 62. As such, the mounting arrangement ensures proper engagement of the bolt 84 and positive retention of the input control rod 38. Additionally, the mounting arrangement 60 provides access, i.e., viewing access, for facilitating periodic inspection by ground support personnel. Moreover, a conventional bolted attachment may be employed which is substantially less costly than the expandable bolt employed in the prior art.

Other advantages of the mounting arrangement 60 relate to enhanced design flexibility for locating and orienting the input control rods 38 and for varying the diametral envelope of the swashplate assembly. With respect to the former, the mounting arrangement 60 situates the mounting axis $84_A$ of the through bolt 84 in a substantially tangential orientation, i.e., perpendicular to a radial line projecting from the rotor shaft axis 16. As such, the offset angle θ (see FIG. 5), i.e., the angular offset of the input control rod 38 relative to the plane of the swashplate assembly 30, may be any angle within a range of about ±25 degrees and is only restricted by the opening $62_O$ in the trunnion fitting 62. Consequently, the designer is provided greater latitude when determining the placement and orientation of the input control rod 38. With respect to the diametral envelope of the swashplate assembly 30, the assembly of the mounting arrangement 60 and/or the orientation of the through bolt 84 is independent of the confines of the stationary swashplate member 32. Accordingly, clearance for bolt installation does not influence or establish a minimum swashplate diameter.

It will be appreciated that the mounting arrangement 60 of the present invention is situated distally from the pitch control mounting locations 90 (see FIG. 4). As such, the spacing or moment arm therebetween is greater than comparable dimensions of prior art swashplate configurations. Such increased spacing reduces the vertical stroke requirements of the input control rod 38 but increases the loads imposed on the mounting arrangement 60 and the swashplate assembly 30.

To react the increased loads and reduce distortion or flexure of the trunnion fitting 62, the mounting arrangement 60 may include a bridge member 68 for structurally interconnecting the uppermost portions of the mounting ears 66. As such, bending loads acting on the mounting ears 66 are, in part, reacted as a tensile or compressive load in the bridge member 68. With respect to the swashplate assembly 30, the radial spokes 70 function to rigidize the stationary swashplate member 32 such that loads are optimally transferred from the horizontal webs 74 to the outer ring segment $72_{OR}$. In the preferred embodiment, the vertical height H (FIG. 4) of each radial spoke 70 is equal to or greater than the separation distance D between the ball elements $36_B$ of the duplex bearing 36. As such, each ball element $36_B$ of the duplex bearing 36 shares a substantially equal portion of the load.

Although the invention has been shown and described with respect to exemplary embodiments thereof, it should be understood by those skilled in the art that other changes, omissions and additions may be made therein and thereto, without departing from the spirit and scope of the present invention. For example, while the exemplary embodiments of the mounting arrangement 60 employ a plurality of bolts 80 to affix the trunnion fitting 62 to the horizontal web 74 of the stationary swashplate member 32, it should be appreciated that any mounting means may be employed for demountably affixing the fitting 62 in combination with the web 74. While the trunnion fitting 62 engages the underside of the horizontal web 74, it may be desirable to reverse the orientation of the trunnion fitting 62 such that it engages the upper surface of the horizontal web 74. While the described embodiment employs a conventional bolt for attaching the input control rod 38 to the trunnion fitting 62, it will be appreciated that any coupling means such as a pin, rod, dowel or cylindrical bar which is captured at both ends may be employed. With regard to the stationary swashplate member 32, the described embodiment employs radial spokes to rigidize the member 32. However, depending upon the magnitude of the imposed loads, the horizontal web 74 may be sufficiently rigid to withstand such loads without distortion or flexure.

What is claimed is:

1. A mounting arrangement (60) for securing a control rod (38) to a stationary swashplate member (32) of a helicopter swashplate assembly (30), said mounting arrangement (60) being characterized by:

said stationary swashplate member (32) having a horizontal web (74) disposed between an inner ring segment ($72_{IR}$) and an outer ring segment ($72_{OR}$), said horizontal web (74) having an aperture (78) and defining a mounting surface ($74_S$);

a trunnion fitting (62) having a base (64) defining a mounting surface ($64_S$) and a pair of mounting ears (66) having aligned apertures ($66_O$), said mounting surface ($64_S$) engaging said mounting surface ($74_S$) of said horizontal web (74) such that said mounting ears (66) are disposed through said aperture (78) of said horizontal web (74);

mounting means (80) for demountably affixing said trunnion fitting (62) in combination with said horizontal web (74); and coupling means (84), disposed in combination with said aligned apertures ($66_O$), for coupling the control rod (38) in combination with said trunnion fitting (62).

2. The mounting arrangement (60) according to claim 1 wherein the swashplate assembly (30) is disposed about a rotor shaft (50) having an axis of rotation (16) and wherein said coupling means defines an axis ($84_A$), said axis ($84_A$) being substantially perpendicular to a radial line projecting from said rotational axis (16).

3. The mounting arrangement (60) according to claim 1 wherein said trunnion fitting (62) includes a bridge member

(68) structurally interconnecting said mounting ears (66) and wherein said trunnion fitting (62) defines an aperture ($62_O$) in said base (64) for accepting the control rod (38).

4. The mounting arrangement (60) according to claim 1 wherein said mounting means (80) is a plurality of bolts disposed through the base (64) of said trunnion fitting (62) and said horizontal web (74).

5. The mounting arrangement (60) according to claim 1 wherein said coupling means is a threaded bolt (84).

6. The mounting arrangement (60) according to claim 2 wherein said trunnion fitting (62) includes a bridge member (68) structurally interconnecting said mounting ears (66) and wherein said trunnion fitting (62) defines an aperture ($62_O$) in said base (64) for accepting the control rod (38).

7. The mounting arrangement (60) according to claim 2 wherein said mounting means (80) is a plurality of bolts disposed through the base (64) of said trunnion fitting (62) and said horizontal web (74).

8. The mounting arrangement (60) according to claim 2 wherein said coupling means (84) is a threaded bolt.

9. A stationary swashplate member (32) for a helicopter swashplate assembly (30), the stationary swashplate member (32) being adapted for coupling at least three control rods (38) thereto and for optimally transferring loads across the swashplate assembly (30), the stationary swashplate member (32) being characterized by:

inner and outer ring segments ($72_{IR}$, $72_{OR}$);

a plurality of radial spokes (70) extending from said inner ring segment ($72_{IR}$) to said outer ring segment ($72_{OR}$);

horizontal webs (74) integrally formed between and structurally interconnecting adjacent radial spokes (70) in areas corresponding to a location of each input control rod (38), each of said horizontal webs (74) defining a mounting surface ($74_S$) and an aperture (78);

a trunnion fitting (62) disposed in combination with each of said horizontal webs (74), each said trunnion fitting (62) having a base (64) defining a mounting surface ($64_S$) and a pair of mounting ears (66) having aligned apertures ($66_O$), said mounting surface ($64_S$) of each said trunnion fitting (62) engaging said mounting surface ($74_S$) of each said horizontal web (74) such that said mounting ears (66) of each said trunnion fitting (32) are disposed through said aperture (78) of each said horizontal web (74);

mounting means (80) for demountably affixing each said trunnion fitting (62) in combination with a respective one of said horizontal webs (74); and coupling means (84), disposed in combination with said aligned apertures ($66_O$) of each said trunnion fitting (62) for coupling each of the control rods (38) in combination with a respective one of said trunnion fittings (62).

10. The stationary swashplate member (32) according to claim 9 wherein said swashplate assembly (30) includes a duplex bearing (36) disposed between a rotating swashplate member (34) and said stationary swashplate member (32), said duplex bearing (36) having ball elements ($36_B$) which define a separation distance D therebetween, and wherein each of said radial spokes (70) defines a height dimension H which is greater than or equal to said separation distance D.

11. The stationary swashplate member (32) according to claim 9 wherein said swashplate assembly (30) is disposed about a rotor shaft (50) having an axis of rotation (16) and wherein each said coupling means (84) defines an axis ($84_A$), said axis ($84_A$) being substantially perpendicular to a radial line projecting from said rotational axis (16).

12. The stationary swashplate member (32) according to claim 9 wherein each said trunnion fitting (62) includes a bridge member (68) structurally interconnecting said mounting ears (66) and wherein each said trunnion fitting (62) defines an aperture ($62_O$) in said base (64) for accepting the respective control rod (38).

13. The stationary swashplate member (32) according to claim 9 wherein each said mounting means (80) is a plurality of bolts disposed through the base (64) of each said trunnion fitting (62) and each said horizontal web (74).

14. The stationary swashplate member (32) according to claim 9 wherein each said coupling means (84) is a threaded bolt.

15. The stationary swashplate member (32) according to claim 10 wherein said swashplate assembly (30) is disposed about a rotor shaft (50) having an axis of rotation (16) and wherein each said coupling means (84) defines an axis ($84_A$), said axis ($84_A$) being substantially perpendicular to a radial line projecting from said rotational axis (16).

16. The stationary swashplate member (32) according to claim 10 wherein each said trunnion fitting (62) includes a bridge member (68) structurally interconnecting said mounting ears (66) and wherein each said trunnion fitting (62) defines an aperture ($62_O$) in said base (64) for accepting the respective control rod (38).

17. The stationary swashplate member (32) according to claim 10 wherein each said mounting means (80) is a plurality of bolts disposed through the base (64) of each said trunnion fitting (62) and each said horizontal web (74).

18. The stationary swashplate member (32) according to claim 10 wherein each said coupling means (84) is a threaded bolt.

* * * * *